(12) United States Patent
Chen et al.

(10) Patent No.: US 7,061,660 B1
(45) Date of Patent: Jun. 13, 2006

(54) MEMS DEVICE WITH FEEDBACK CONTROL

(75) Inventors: Zhizhang Chen, Corvallis, OR (US); Hang Liao, Corvallis, OR (US); Sriram Ramamoorthi, Corvallis, OR (US); Timothy F. Myers, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/105,802

(22) Filed: Apr. 13, 2005

(51) Int. Cl.
*G02B 26/00* (2006.01)

(52) U.S. Cl. ...................................... 359/238; 359/237
(58) Field of Classification Search ................ 359/290, 359/291, 292, 295, 223, 224, 238
See application file for complete search history.

(56) References Cited

U.S. PATENT DOCUMENTS

| | | | |
|---|---|---|---|
| 2001/0055147 A1* | 12/2001 | Little et al. | 359/293 |
| 2003/0117690 A1* | 6/2003 | Oda et al. | 359/298 |
| 2004/0061925 A1* | 4/2004 | Azarov et al. | 359/291 |
| 2004/0184717 A1* | 9/2004 | Koontz et al. | 385/18 |

\* cited by examiner

*Primary Examiner*—Timothy Thompson
*Assistant Examiner*—Jerry Fang
(74) *Attorney, Agent, or Firm*—Timothy F. Myers (57) ABSTRACT

A MEMS device includes at least one movable member and an active device having at least one property affected by the location of the movable member with respect to the active device. A control circuit is used to limit movement of the movable member based on observation of the property affected by the active device.

12 Claims, 10 Drawing Sheets

MEMS DEVICE WITH FEEDBACK CONTROL

BACKGROUND OF THE INVENTION

Electrostatic micro-electromechanical (MEMs) devices typically are fabricated with semiconductor or other thin and thick film technologies. The MEMs devices often times have electrostatic actuators that are used to control various functions in display devices, high precision position sensors, pressure sensors, voltage modulators, accelerometers, oscillators, and adaptive optics, just to name a few. Electrostatic actuation is generally performed using a constant voltage source as the implementation of the control is less complicated than other methods. However, this form of electrostatic control has snap-in issues when the controllable gaps are reduced below a threshold limit. Further, if a gap separates two different metal plates and the gap is removed by allowing the two metal plates to contact each other, striction forces can prevent the two metal plates from becoming separated. Conventional devices incorporate mechanical stops to limit the gap displacement but these can be difficult to fabricate as there is often still some striction forces from the stops themselves. Accordingly, there is a need for better electrostatic control using voltage sources while preventing striction forces to occur.

SUMMARY OF THE INVENTION

A MEMS device includes at least one movable member and an active device having at least one property affected by the location of the movable member with respect to the active device. A control circuit is used to limit movement of the movable member based on observation of the property affected by the active device.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar parts through the several views.

DETAILED DESCRIPTION OF THE PREFERRED EMBODIMENT

The MEMs devices of the present invention are applicable to a broad range of semiconductor, thin and thick film device technologies and can be fabricated from a variety of semiconductor technology related materials. The following description discusses several presently preferred embodiments of the MEMs and active devices of the present invention as implemented in silicon substrates, since the majority of currently available semiconductor devices are fabricated in silicon substrates and the most commonly encountered applications of the present invention will involve silicon substrates. Nevertheless, the present invention may also advantageously be employed in gallium arsenide, germanium, and other semiconductor materials. In addition, the present invention is not intended to be limited to those devices fabricated in silicon semiconductor materials, but will include those devices fabricated in one or more of the available MEMs and semiconductor related materials and technologies available to those skilled in the art, such as thin-film-transistor (TFT) technology using polysilicon on glass substrates.

It should be noted that the drawings are not true to scale. Further, various parts of the active elements have not been drawn to scale. Certain dimensions have been exaggerated in relation to other dimensions in order to provide a clearer illustration and understanding of the present invention.

In addition, although some of the embodiments illustrated herein are shown in two-dimensional views with various regions having depth and width, it should be clearly understood that these regions are illustrations of only a portion of a device that is actually a three-dimensional structure. Accordingly, these regions will have three dimensions, including length, width, and depth, when fabricated on an actual device. Moreover, while the present invention is illustrated by exemplary embodiments directed to active devices, it is not intended that these illustration be a limitation on the scope or applicability of the present invention. It is not intended that the active devices of the present invention be limited to the physical structures illustrated. These structures are included to demonstrate the utility and application of the present invention to presently presented exemplary embodiments.

The embodiments presented herein use a moving electrode of a MEMs actuator to affect an electrical property of an active device. An active device as used herein is a semiconductor, magnetic, opto-electric, interface or thin film device that has a sensed property that is affected by external influence such as electric fields, magnetic fields, or electromagnetic radiation or photons. Generally the electrical property has a non-linear relationship to the external fields or photons such that when a particular level of the fields or photons received is reached, a large change in the sensed property is detectable. The external influence includes photon energy, electrical field, temperature gradient, magnetic field, pressure, temperature, or combinations thereof. Typical active devices include junction transistors, photo-transistors, surface state transistors, field effect transistors, thin-film transistors, metal insulator metal or semiconductor diodes, tunnel diodes, Shottky diodes, point contact diodes, photodiodes, and field-effect diodes, just to name a few. Thus, the active devices may include bulk-effect devices, single-junction or interface devices, or multiple junction or interface devices.

In embodiments, a closed loop feedback control circuit uses the affected electrical property to control the voltage to the moving electrode to keep it less than the "snap-in voltage." The snap-in voltage is that voltage where the electrostatic attraction of the moving electrode to a control plate or actuator is greater than the mechanical force which resists its movement. Using the details describe within this specification, the precision and sensitivity of the position of the moving electrode can be custom designed as required for a particular application.

For instance, in one embodiment a MEMs device is designed to have a movable plate, a built-in transistor beneath the movable plate and a voltage-current close loop feedback circuit. The movable plate serves as a floating gate electrode of the built-in transistor. As such, the moving electrode of the actuator acts as a gate of the built-in transistor to become a sensing FET. The closed-loop feedback circuit is designed to control the voltage to the moving electrode so the gate voltage is always less than the snap-in voltage. In some embodiments, the gate is movable within a range of 20 nanometers to 5000 nanometers of the source and drain or the electrode actuator. In some embodiments, the voltage is limited by the control circuit such that the movable gate and its actuator have a minimum separation distance greater than 100 nanometers, thus providing an electrical rather than mechanical stop.

There are several advantages or benefits of the embodiments of the disclosure over conventional designs. One benefit is that the voltage applied to the MEMs moving electrodes can still be controlled by voltage modulation. A second benefit is that the fabrication process is compatible with conventional integrated circuit and other MEMs manufacturing processes. Another benefit is that electrostatic striction and snap-down is prevented by the built-in closed loop feedback control. These and other benefits allow the designer to either maximize the utilization of the MEMs spatial working distance or to minimize the electromechanical constraints on a MEM's working distance. Further, since the MEMs and the active control elements can be built on the same substrate, no extra external control circuit is required. Several other benefits and design modifications will be apparent in the following detailed description of exemplary embodiments of the invention that follow in FIGS. 1–14.

Figure 1:
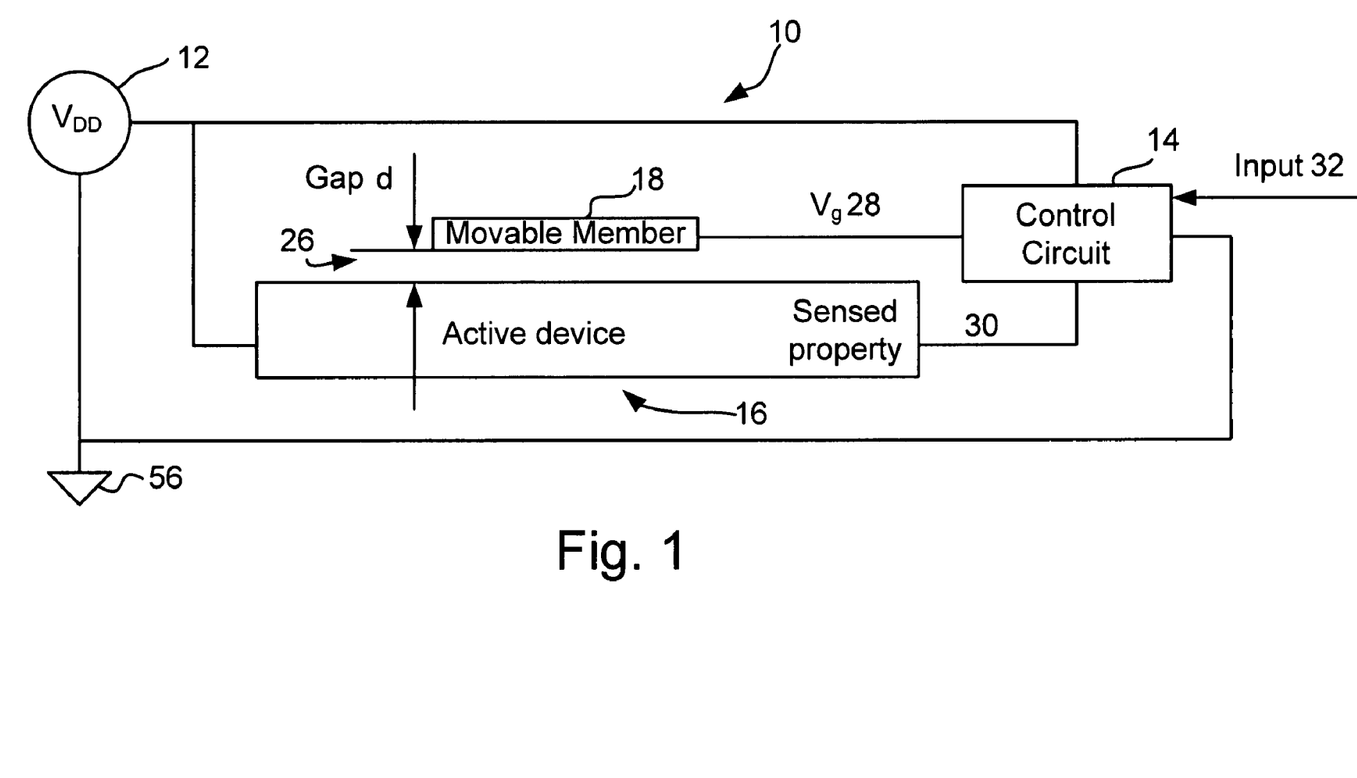
FIG. 1 is a block diagram of a MEMs device with a feedback control circuit to control a gap distance in one embodiment of the invention.

FIG. 1 is a schematic diagram of one embodiment of the invention in which a movable actuator or member is incorporated as the gate electrode of a built-in FET transistor used as an active device in the feedback control structure. MEMs device 10 has a movable actuator such as a movable member 18 of an integrated active device 16. Active device 16 may be a semiconductor device, such as a field effect transistors (FET), or a tunneling device, such as a photosensitive tunneling diode or wavelength sensitive photoconductor. The active device 16 is controlled by a control circuit 14 based on an input 32 and feedback in the form of a sensed property 30, such as with current or voltage, from the active device 16. The control circuit 14 has an output 28 which supplies a voltage $V_g$ to the movable member 18. Power is supplied to the active device 16 and the control circuit 14 with voltage source 12 which supplies a voltage VDD with respect to ground (GND) 56. The movable member 18 is separated from an electrode actuator adjacent to or part of the active device 16 by a gap distance (d) 26 which is variable. As the movable member 18 moves closer to the active device 16, it affects a property of the active device 16 which can be sensed, such as with voltage or current. This sensed property 30 is used by the control circuit 14 to modify the output 28 to prevent the gap distance 26 from becoming less than a predetermined limit thereby creating an electrical stop. Thus by having active feedback control of such an electrostatic actuator as the movable member 18, the movement of the movable member 18 with respect to an electrode or other actuator allows the gap distance 26 to be precisely and sensitively controlled better than with a conventional open loop voltage controlled system.

Figure 2A:
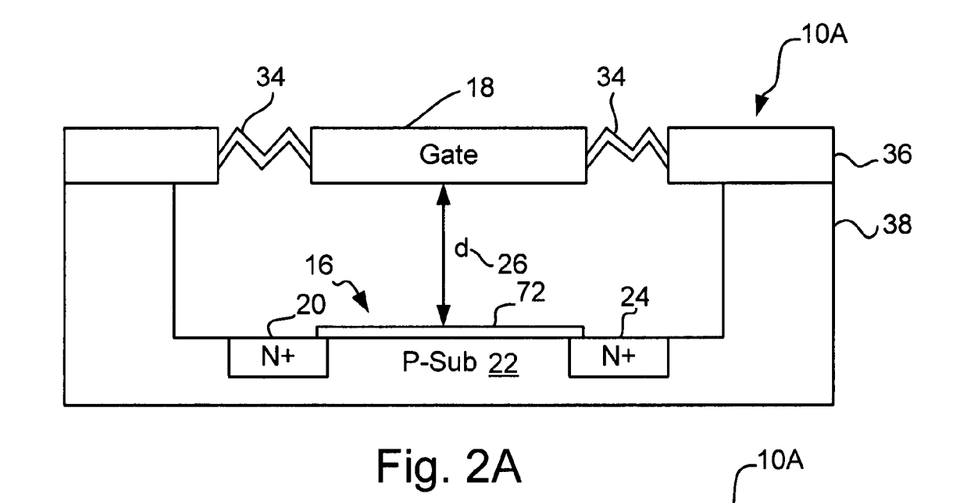
FIG. 2A is an illustration of a cross sectional view of a MEMs device that incorporates a transistor into its structure as part of the feedback control circuit in one embodiment of the invention.
Figure 2B:
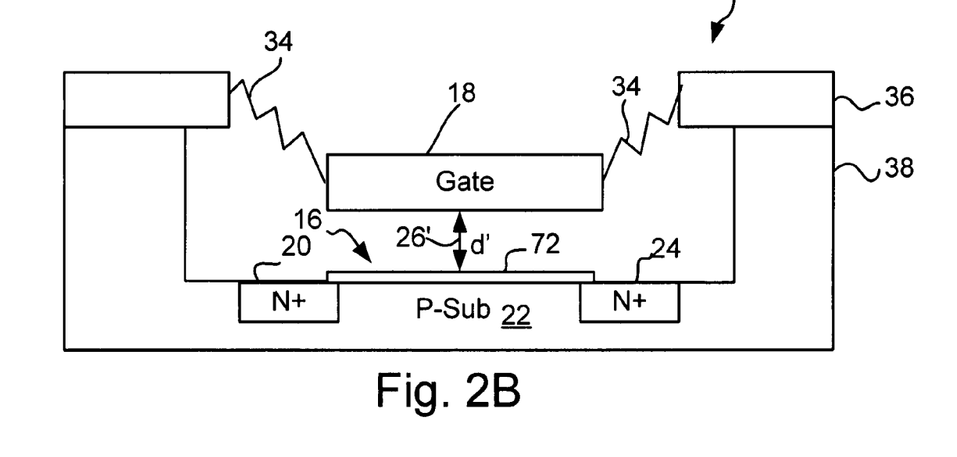
FIG. 2B is an illustration of the MEMs device of FIG. 2A in a different mechanical state that that shown in FIG. 2A.

FIGS. 2A and 2B are exemplary cross-sectional profiles of one embodiment of a MEMs device 10A used as a Fabry-Perot interferometer that includes active feedback control. In this embodiment, the movable member 18 is a partial reflector and partially transparent to allow light to pass to a P doped substrate 38 which is used as a gate region 22. The movable member 18 is used as a gate electrode and is suspended with spring flexures 34 from supports 36 to form a mechanically floating gate electrode of the built in FET transistor. The spring flexures 34 mechanically bias the movable member 18 a distance d 26 from the gate region 22 and are a mechanically biasing mechanism to urge the reflective surface of movable member 18 to a position away from the reflective surface of an electrode 72 on substrate 38. The P doped substrate 38 has two implanted N+ regions which form the drain region 20 and the source region 24 of the FET. As a voltage is applied between the movable member 18 and the reflective and conductive electrode 72 adjacent to the gate region (but not shorting the transistor regions, see FIG. 7), the movable member 18 is attracted to the electrode 72 by an electro-static force decreasing the gap distance to a distance d' 26'. This electro-static force is counterbalanced by the mechanical force of spring flexures 34. Light which enters through the movable member 18 is reflected from the electrode 72 and constructively and destructively interferes such that only portions of certain wavelengths that are approximately integer multiples of four times the distance d' 26' are allowed to be re-transmitted through movable member 18. Thus, the Fabry-Perot interferometer in this embodiment acts as a programmable color filter. The maximum amount of voltage that is applied to the movable member 18 is limited by an active feedback circuit based on current sensed through the FET to prevent electrostatic striction between the movable member 18 and the electrode 72.

Figure 3:
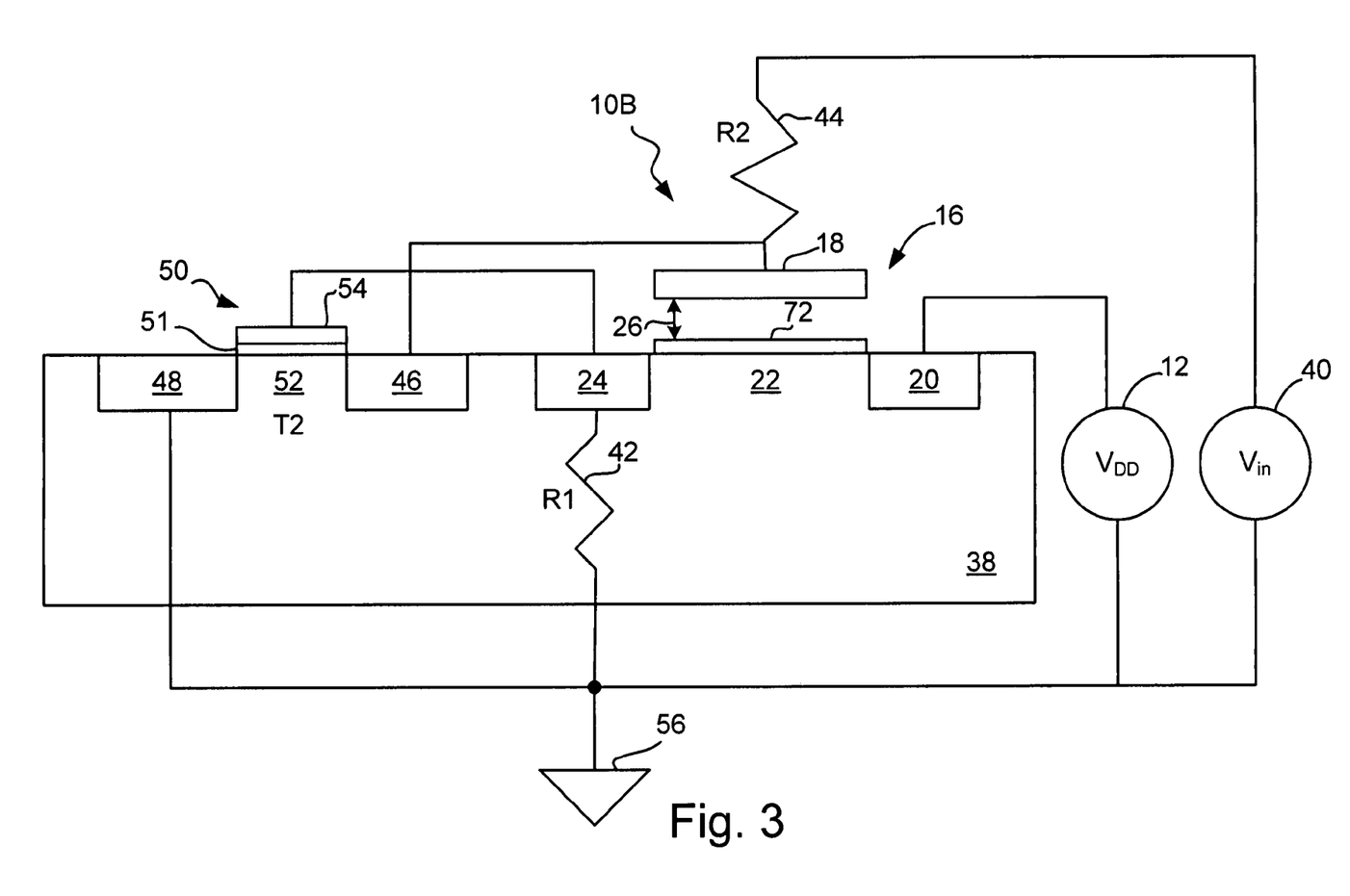
FIG. 3 is a schematic diagram of one embodiment of the invention.

FIG. 3 is an exemplary schematic view of another embodiment 10B in which the active device 16, a movable gate FET T1 is further integrated with a conventional FET T2 50 to form the active feedback control to limit the displacement of the movable member 18 such that gap 26 has a minimum gap distance or electrical stop. In this embodiment, the movable gate FET T1 and the conventional FET T2 are integrated into a single substrate 38. Voltage source 12 supplies a voltage VDD to drain region 20 of T1. The source region 24 of T1 is connected to GND 56 through a resistance R1 42. The source region 24 is further connected to the gate 54 of FET T2 50. The source region 48 of FET T2 50 is connected to GND 56. The drain region 46 of FET T2 50 is connected to the movable member 18 of movable gate FET 51 which is in turn coupled to an input $V_{in}$ 40 through a resistance R2 44. The gate 54 of FET T2 is isolated from gate region 52 with a gate oxide 51, thus forming a conventional enhancement mode transistor.

Figure 4:
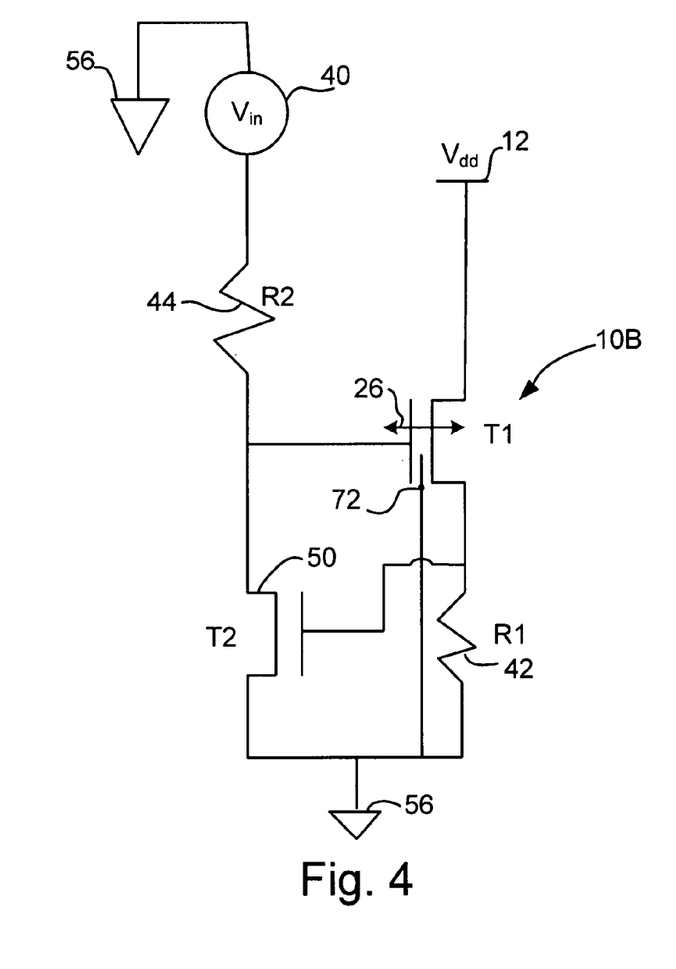
FIG. 4 is an alternative schematic diagram of one embodiment of the invention.

FIG. 4 is a simplified schematic of the embodiment 10B shown in FIG. 3 to better explain the operation of the active feedback control. As the voltage $V_{in}$ 40 voltage increases the voltage on the gate of T1 increases causing the adjustable gap 26 to decrease. As the movable member 18 gets closer to the gate region 22 the electric field increases. This increase in electric field causes the current within T1 to increase thereby causing the voltage across R1 42 to increase. In turn, this voltage increase of R1 42, as it is coupled to the gate of T2 50, causes the current within T2 to increase which will cause the voltage applied to the gate of T1 to decrease. Thus there is active negative feedback. Since the gate of T2 has a particular voltage threshold that must be reached before current begins to flow, the circuit can be designed to allow T1 to have a region of operation in which it can operate normally before the feed-back mechanism is activated.

Figure 5:
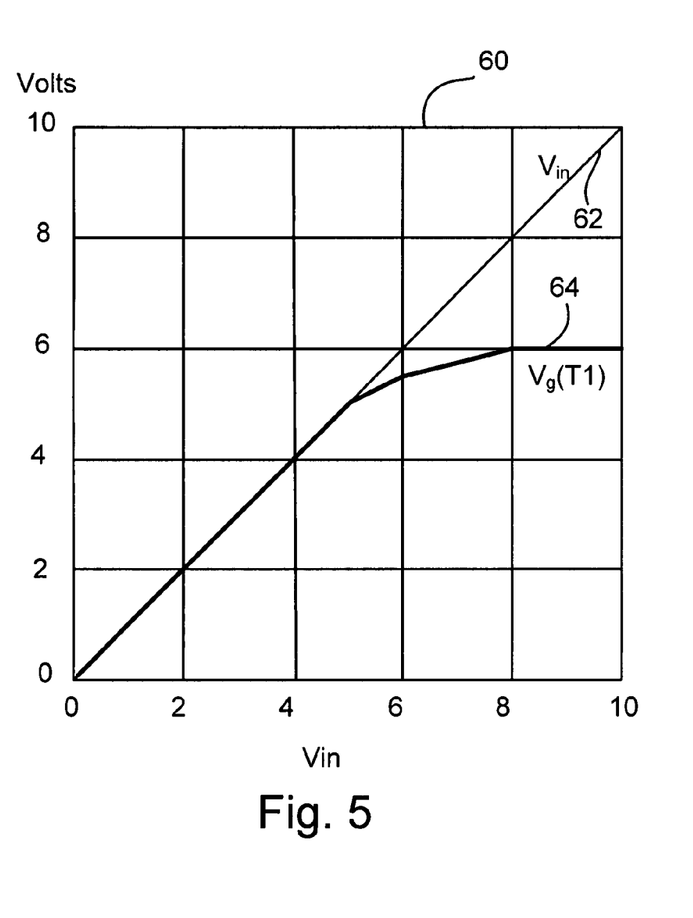
FIG. 5 is a graph of the input voltage versus the gate voltage in one embodiment of the invention.

For instance, FIG. 5 is an exemplary graph 60 showing the gate voltage of T1 in one embodiment with respect to the input voltage $V_{in}$. The line 62 is $V_{in}$ 40, and the line 64 is the modulated feedback voltage on the floating movable member 18 of T1. In this embodiment, the desired max voltage is about 6 volts and the activation voltage for the feed-back control circuit has been chosen to be about 5 volts for $V_{in}$ by setting the gate threshold voltage of T1 to be about 5V near the desired limit of distance 26. As shown in FIG. 5, as the activation voltage of about 5 volts is reached for $V_{in}$, the voltage to the gate of T1 begins to limit as T2 begins to turn on due to T1 supplying current to R1 42. T2 conducts current from R2 44 to GND and limits the maximum voltage applied to T1 to about 6 volts.

Figure 6:
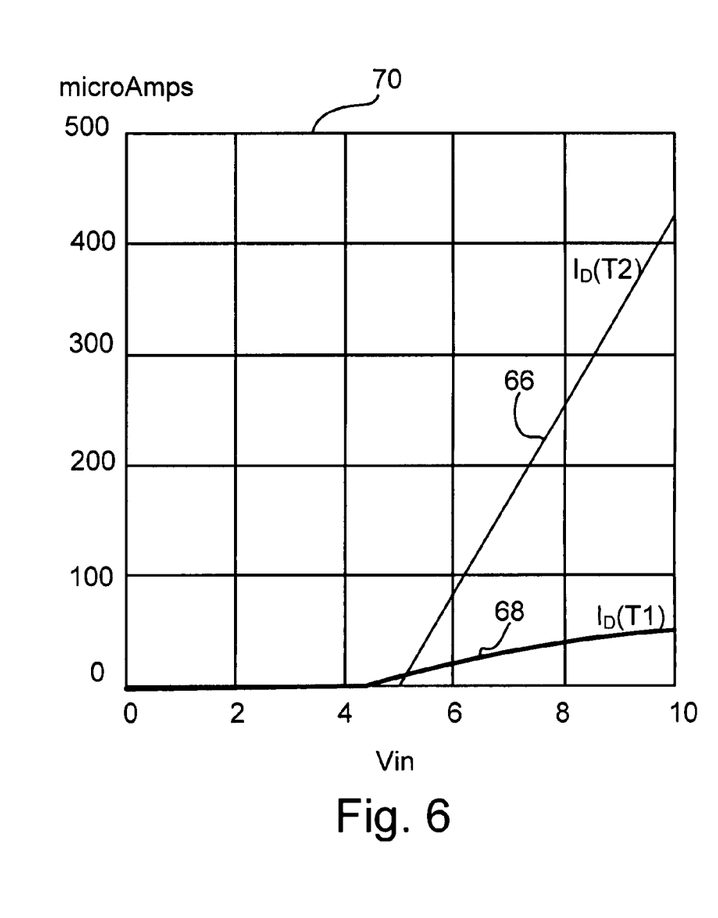
FIG. 6 is a graph of the input voltage versus drain currents in one embodiment of the invention.

FIG. 6 is an exemplary graph 70 showing the drain currents $I_D$ within the transistors T1 and T2. The drain current $I_D$ (T1) 68 begins to flow when the gap distance 26 is reached by an applied voltage of almost 5V on the movable member 18. As the drain current $I_D$ (T1) begins to flow, the voltage across R1 increases, causing the voltage on the gate of T2 to increase. Once its gate threshold is reached, current within T2 begins to flow which pulls down the voltage on movable member 18, the gate of T1. As $V_{in}$ increases, all of the current through R2 is directed through T2. If T2 pulls down the voltage on movable member 18 of T1 too low, less current flows through T1 causing the voltage across R1 to decrease which decreases the gate voltage of T2 which in turn lessens the current though it and thus the voltage on the gate of T1 would rise. Thus, the feed-back control circuit is able to maintain a steady maximum voltage to the movable member 18 of T1 as shown by line 64 of graph 60. This steady maximum voltage translates into a minimum separation distance, thereby creating an electrical stop and obviating the need for a mechanical stop. Proper design of the circuitry and spring flexures allows this voltage to be set a level before snap-in occurs and thus snap-in can be prevented.

Figure 7:
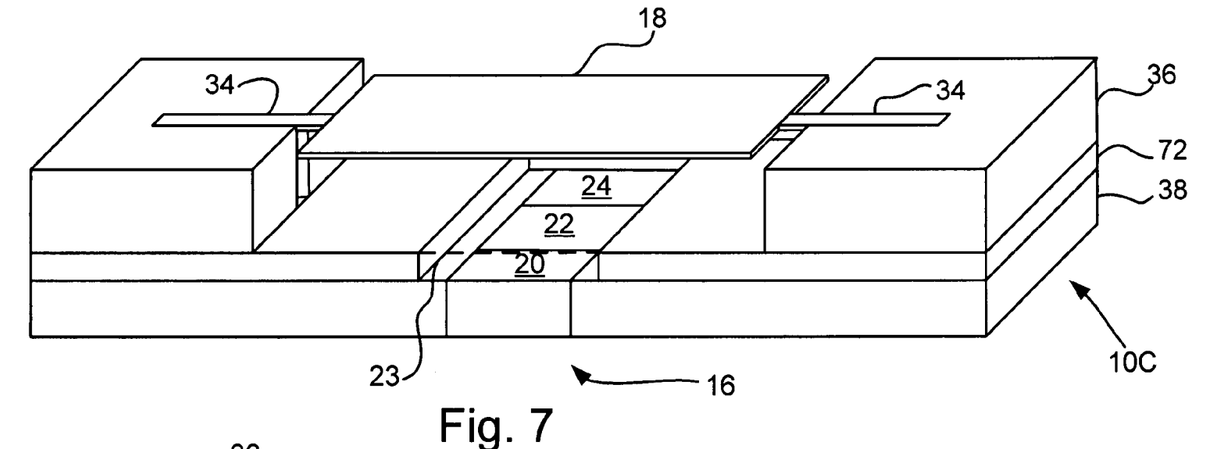
FIG. 7 is a perspective view of a MEMs device that incorporates active feedback in one embodiment of the invention.

FIG. 7 is a perspective view of one embodiment of a MEMs device 10C. In this embodiment, the movable member 18 is held by spring flexures 34 on supports 36. A reflective and conductive plate 72 is disposed adjacent to the active device 16 on the substrate 38 and has an opening which exposes the source region 24, gate region 22 and drain region 20 of the active device 16. Shown in ghost, a hide layer 23, that is substantially opaque to electromagnetic radiation such as I/R, UV and visible light, is disposed over the active device 16 to prevent incident radiation from affecting the operation of the transistor. In some embodiments, such as with a photo transistor, some or all of the electromagnetic radiation is allowed to be detected by the active device 16 and the hide layer 23 is not present or modified accordingly.

Figure 8:
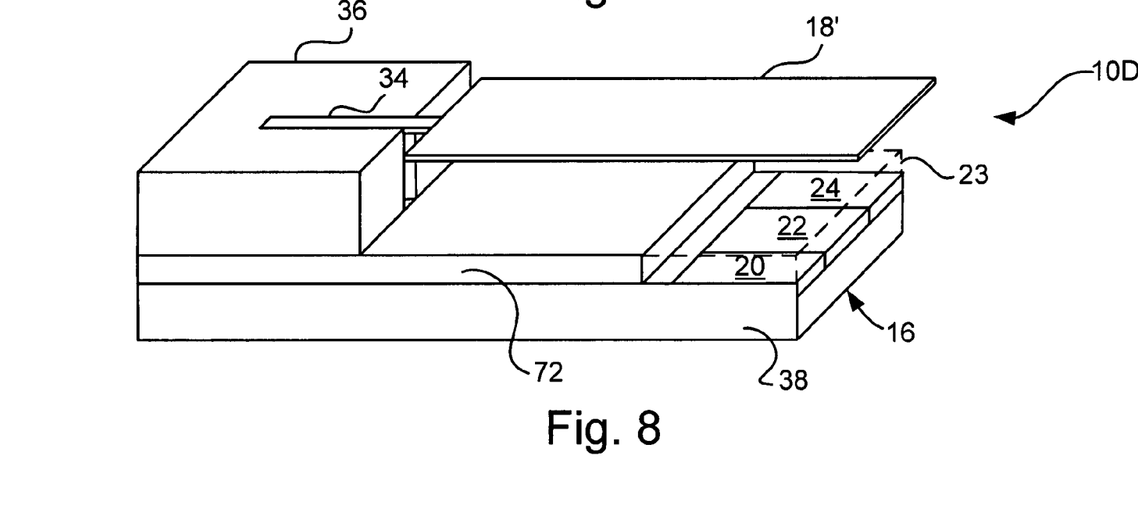
FIG. 8 is a perspective view of a MEMs device that incorporates active feedback in another embodiment of the invention.

FIG. 8 is a perspective view of an alternative embodiment of the invention which illustrates a single hinge cantilever design for movable member 18'. In this embodiment, the movable member 18' is supported by a single spring flexure 34 which holds the movable member 18' in a cantilevered fashion over the active device 16. The spring flexure 34 is held by support 36. A conductive plate 72 is disposed on the substrate 38 beneath the movable member 18' and adjacent to active device 16. The active device 16 is exposed at least partially to the gate region 22 which is disposed between the drain region 20 and the source region 24. Similarly as in FIG. 7, a hide layer 23 (shown in ghost) may be disposed over the active device 16.

In one embodiment, the movable member 18' is reflective and is used to bend the angle of the light which strikes its reflective surface. In this embodiment, the MEMs device 10D, is a rotatable micro-mirror structure. Alternatively in another embodiment, movable member 18' may have a diffraction grating applied thereon to change the color of light based on the angle of the movable member 18'.

Figure 9:
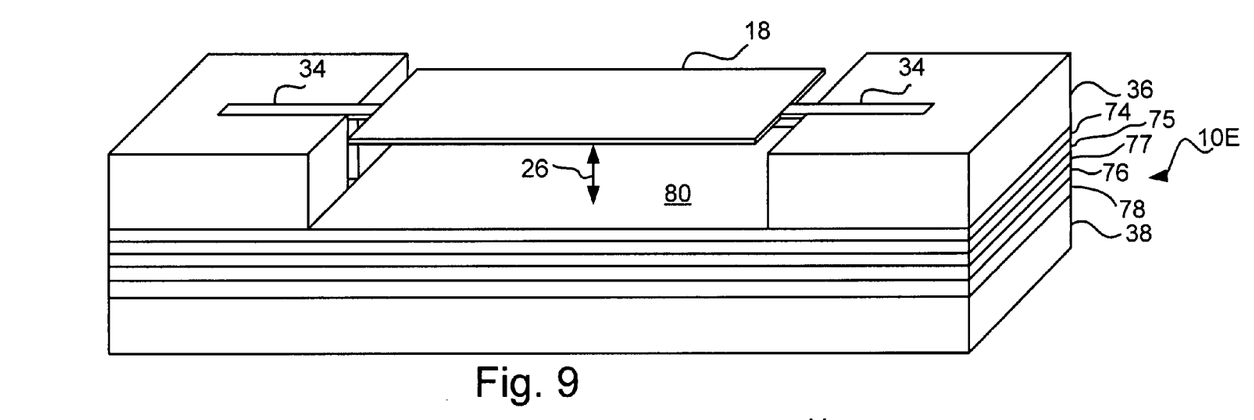
FIG. 9 is a perspective view of a MEMs device that incorporates active feedback in another embodiment of the invention.

FIG. 9 is perspective view of an alternative embodiment of a MEMs device 10E which includes an alternative active device 80, a photonic sensitive tunneling diode or wavelength sensitive photoconductor. In this embodiment, MEMs device 10E is designed as a Fabry-Perot light modulator with a movable member 18 that is partially reflective and supported by spring flexures 34 held by supports 36. Substrate 38 supports a first tunneling electrode layer 78 on which is disposed a tunneling layer 76, such as about 100 angstroms of titanium oxide (TiO). However, other materials and thicknesses of the TiO or other materials can be substituted by those of skill in the art. Disposed on the tunneling layer 76 is a second tunneling electrode 77 which is at least a partially transparent conductor. Second tunneling electrode 77 is transparent or has openings which allow for electromagnetic radiation to be absorbed in the tunneling layer 76. Disposed on the second tunneling electrode 77 is a substantially transparent dielectric layer 75. Further disposed on the dielectric layer 75 is an actuator electrode 74 which is partially transparent but mostly reflective, such as 90% or 95% reflective. This actuator electrode 74 allows light that constructively interferes within the cavity created by the movable member 18 and the actuator electrode 74 to pass to the tunneling layer 76 through the dielectric layer 75 and second tunneling electrode 77 which are at least partially transparent. This passed light will affect the amount of tunneling current depending on the tunneling diode's bias voltage and the wavelength of the incoming light. The wavelength of the incoming light that constructively interferes is determined by the gap distance 26. Therefore, the amount of current to be sensed is proportional to a frequency of light striking the interferometer.

When photon's of a particular energy (based on the light wavelength) penetrate into the tunneling layer through the second tunneling electrode 74, the electrons in the tunneling layer atoms will be excited such that the amount of energy required to tunnel will be reduced. This will cause the tunneling current to increase. More information on the operation and creation of a photonic sensitive tunneling diode is found in commonly assigned application Ser. No. 10/337,685, filed Jan. 6, 2003, and Ser. No. 10/781,212, filed Feb. 17, 2004, both of which are hereby incorporated by reference within.

Figure 10:
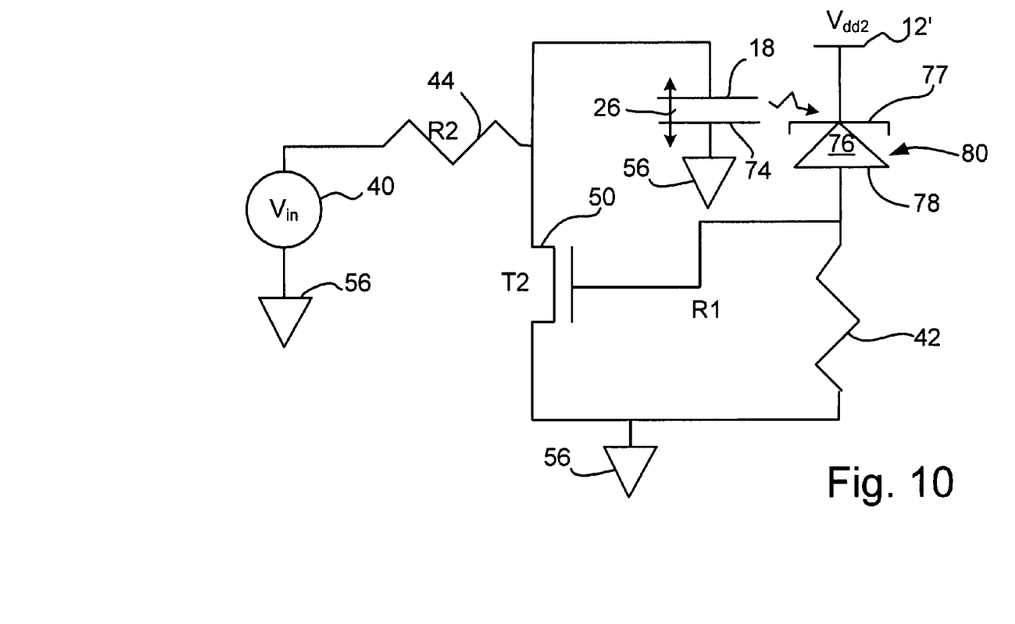
FIG. 10 is an exemplary schematic of the MEMs device with active feedback for the embodiment shown in FIG. 9.

FIG. 10 is an exemplary schematic of the embodiment shown in FIG. 9 used in an active feedback control circuit to limit the travel of the movable member 18. In this embodiment of the active feedback control circuit, a photonic sensitive tunneling diode 80 is biased with a voltage source $V_{DD2}$ 12' to set a band gap voltage that must be exceeded to begin the tunneling current. This effect is similar to designing the threshold voltage of a FET Transistor except in this case, the threshold can be programmed by the voltage source $V_{DD2}$ 12' to compensate for process, temperature, or other factors such as the decay of light intensity from a bulb in a light source over time. As the $V_{in}$ 40 voltage increases, the voltage on the movable member 18 increases and the gate is attracted to the actuator electrode 74. As the gap distance 26 decreases the wavelength of light that is constructively interfered decreases (e.g. the frequency of the light and its energy increases). As some of the light is allowed to pass to the tunneling layer 76, some electron states within the layer will be increased such that the tunneling current will become larger. As the tunneling current increases, the voltage across R1 42 increases, which increases the voltage on FET T2 50. As the voltage on T2 50 increases, its drain current increases causing the voltage applied to the movable member 18 to decrease. As the movable member 18 voltage decreases, the gap 26 increases causing the wavelength of light to increase and thus limiting the amount of energy into the tunneling layer, thereby reducing the tunneling current. Accordingly, there is active feedback which causes the moveable movable member 18 to limit its motion. Since the gap distance is directly related to the wavelength of the light, the color can be easily adjusted by controlling the voltage source $V_{DD2}$ 12'. Therefore, if there is process or temperature variations that affect the MEMs device performance over a large array of devices, any variation can be compensated for by adjusting the $V_{DD2}$ 12' voltage.

Figure 11:
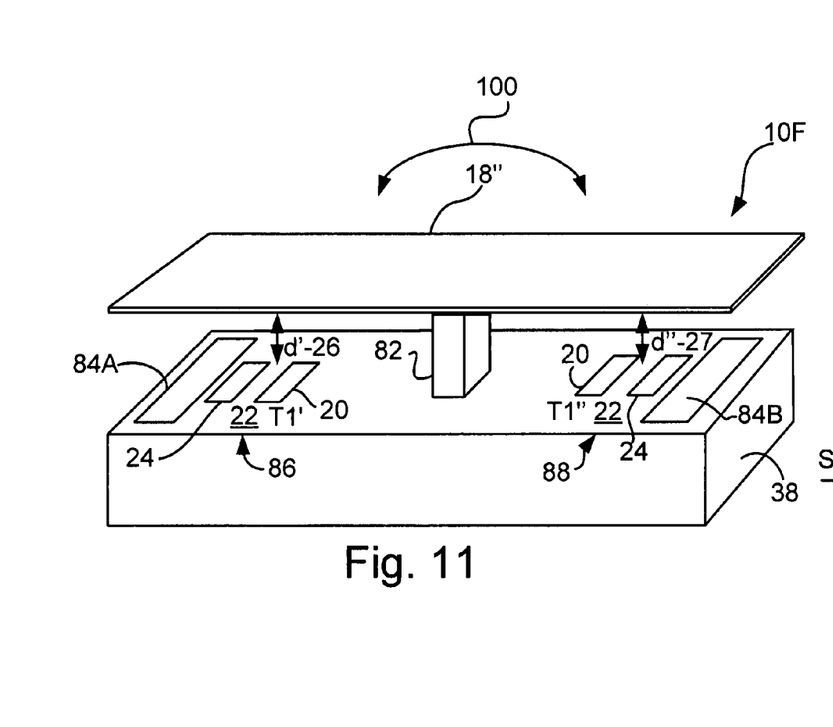
FIG. 11 is a perspective view of a MEMs device that incorporates active feedback in another embodiment of the invention.

FIG. 11 is a perspective view of an additional embodiment of a MEMs device 10F which is implemented as a rotatable micro-mirror device that supports multiple positions 100 and includes more than one integrated movable gate transistor controlled by a single movable member 18" having a reflective top surface. The movable member 18" is supported by a hinge post 82 above a substrate 38. The substrate 38 includes a first movable gate transistor 88 and a second movable gate transistor 86 as active devices to control the movement of movable member 18". Each of the first and second moveable gate transistors 86 and 88 have a gate region 22, a drain region 20, and a source region 24. Adjacent to the first movable gate transistor 86 is an first electrode 84A and adjacent to the second movable gate transistor 88 is a second electrode 84B. First and second electrodes 84A and 84B are connected or switchable to a known voltage such as ground or some other potential.

Figure 12:
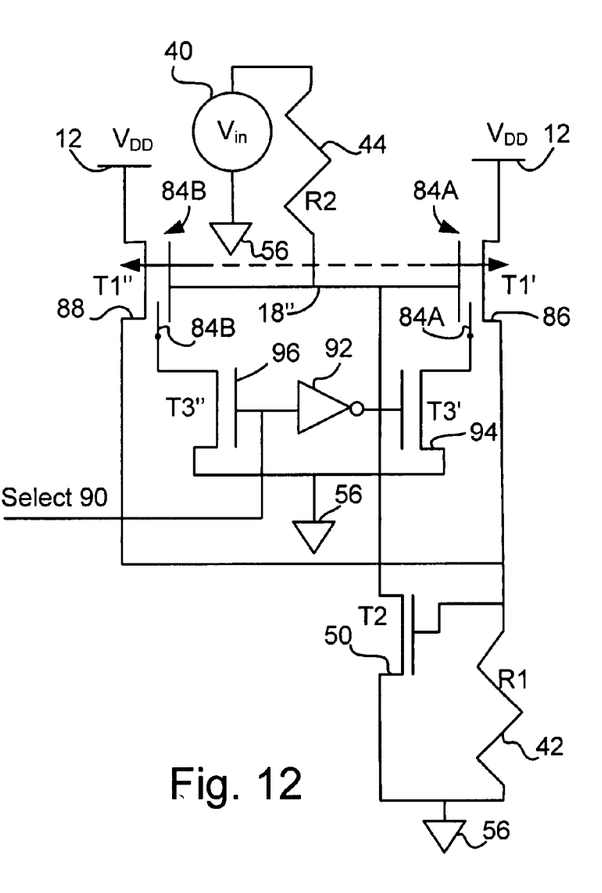
FIG. 12 is an exemplary schematic of the MEMs device with active feedback for the embodiment shown in FIG. 11.

FIG. 12 is an exemplary active feedback control circuit which can be used with the embodiment of the MEMs device 10F shown in FIG. 11. In this embodiment, a voltage source VDD 12 supplies power to the drains of first and second movable gate transistors 86 (T1') and 88 (T1"). The movable member 18" of the T1' and T1" transistors is connected to an input voltage source $V_{in}$ 40 through a resistor R2 44. The movable member 18" is also electrically connected to the drain of control transistor T2 50. The source of the control transistor 50 is connected to ground 56. The gate of T2 50 is connected to the source of T1' 86, the source of T1" 88 and resistor R1 42. Resistor R1 and the source of T2 50 are further connected to GND 56. The first and second electrodes 84A and 84B are connected the drains of first and second select transistors T3' 94 and T3" 96, respectively. The sources of first and second select transistors T3' 94 and T3" 96 are connected to ground 56. The gate of first select transistor T3' 94 is connected to the output of an inverter 92. The gate of the second select transistor T3" 96 is connected to a select signal 90 and the input of the inverter 92.

When the input voltage $V_{in}$ 40 is set to zero, the movable member 18" is designed to be biased in a neutral position substantially parallel to the substrate 38. When $V_{in}$ 40 is set to a voltage sufficient to cause the movable gate to be attracted to one of the first or second electrodes 84A or 84B, respectively, it will be attracted to the electrode that is connected to GND 56 through the first 94 or second 96 select transistors depending on the state of the select signal 90 and inverter 92. As the movable member 18" approaches one of the first or second electrodes 84A or 84B, the current in one of the T1' or T1" transistors increases thereby causing the voltage across R1 42 to increase. This voltage increase causes the gate of T2 50 to increase, thereby increasing the current through T2 50. This increase in current in T2 50 acts to pull down the voltage on movable member 18" thus preventing it to move past a minimum distance for d' 26 or d" 27 thereby preventing snap-down. Because snap-down can be prevented, the voltage on $V_{in}$ can be adjusted to allow for multiple tilt angles 100 or alternatively just be digitally driven to a full tilt state. By having multiple tilt angle control, the MEMs device 10F can be used individually or in arrays to create holographic images, create phased arrays of light, or be used in adaptive optics, just to name a few.

Figure 13:
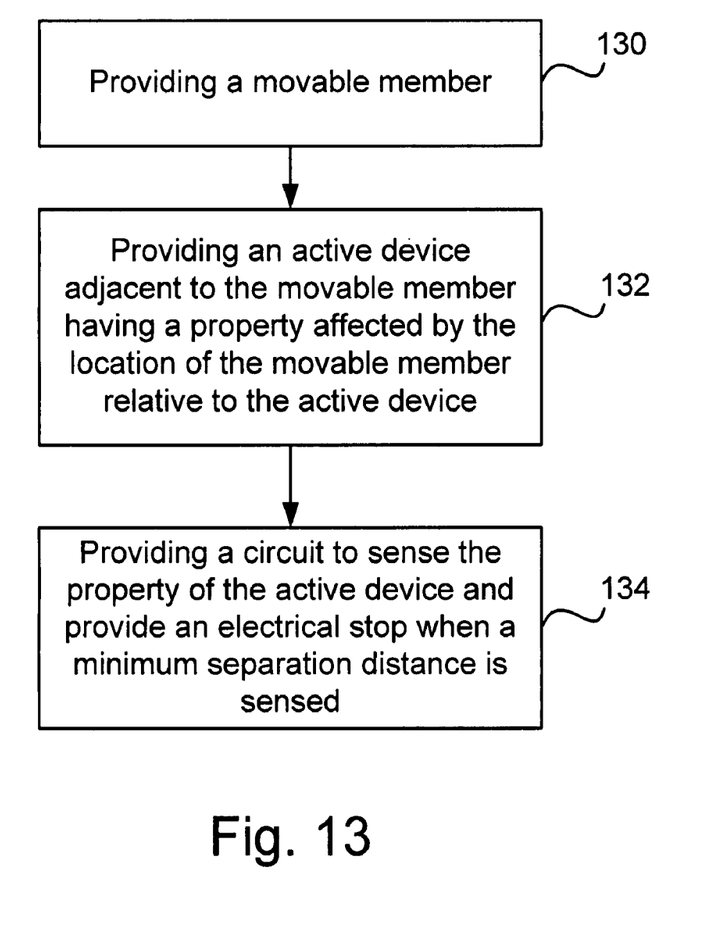
FIG. 13 is an exemplary block diagram of a method of making a MEMs device in one embodiment of the invention.

FIG. 13 is an exemplary block diagram of a method of making an embodiment of the invention. In one embodiment, one method of making a MEMs device includes providing a movable member 18 which may be a vertically offset movable plate for a Fabry-Perot interferometer, rotatable plate, a reflective rotatable plate, or a diffractive movable plate as described in several of the exemplary example herein. Other movable members such as in accelerometers, pressure sensors, voltage modulators, position sensors, and the like may take advantage and be made with the invention to prevent striction or otherwise control displacement of the movable member. The movable member may be supported by a flexible member such as a hinge or spring flexure to provide a counterbalancing mechanical force to a electrostatic force used to move the movable member 18.

Also provided is an active device disposed adjacent to the movable member that has a property affected by the location of the movable member relative to the active device. In one embodiment, the property may be the drain current of an enhancement mode FET in which the movable member 18 is a mechanically floating gate electrode. In another embodiment, the property may be the current through a tunneling device that is affected by the wavelength of the light which is allowed to reach the tunneling layer of the tunneling device. Other embodiments would include depletion mode FETs, non-tunneling diodes and the like which may have some property that is affected by the placement of a movable member that can alter the electric field or energy of photons that reach the sensing device.

The MEMs device is also provided with a circuit to sense the property of the active device and preferably to provide an electrical stop when a minimum separation distance is sensed. Alternatively, rather than or in addition to limiting the minimum separation distance, the feedback can be used to provide precise position control of the movable member with respect to the active device. The feedback circuit can include a non-linear device sensor such as a transistor, diode, or other semiconductor to provide for gain when a particular predetermined threshold is reached, such as the minimum separation distance. Alternatively, amplifying circuits can be used along with linear sensor along with comparator circuits to set when the predetermined thresholds are reached. Preferably, the circuit used to provide feedback is integrated onto the same substrate as the MEMs device but alternatively it can be part of a multi-substrate assembly or be externally supplied.

Figure 14:
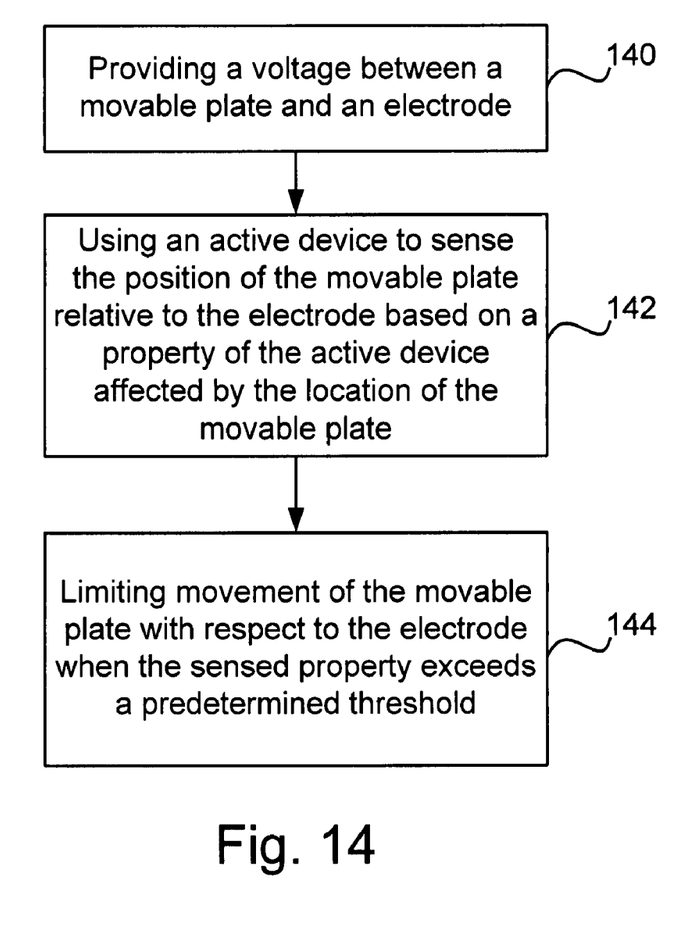
FIG. 14 is an exemplary block diagram of a method of using a MEMs device in one embodiment of the invention.

FIG. 14 is an exemplary block diagram of a method of using an embodiment of the invention. For instance, one method of using a MEMs device includes providing a voltage between a movable plate and an electrode. The voltage may be a constant voltage or a time varying voltage. Alternatively, the voltage may be determined by the amount of charge place on the movable plate and the electrode and thus the voltage would vary depending on the distance between the movable plate and the electrode.

An active device is used to sense the position of the movable plate relative to the electrode based on a property of the active device affected by the location of the movable plate. Generally for active devices, the property affected will result in a change of voltage potential across two points in the active device or current within the device which will have a non-linear or exponential relationship with respect to the position of the movable plate relative to the electrode. The active device's sensed property is used to limit movement of the movable plate with respect to the electrode when the sensed property exceeds a predetermined threshold. This limited movement may be achieved by limiting the maximum amount of voltage that is applied to the movable plate and electrode, or it can be achieved by regulating the amount of charge that is allowed to accumulate on the movable plate.

Figure 15:
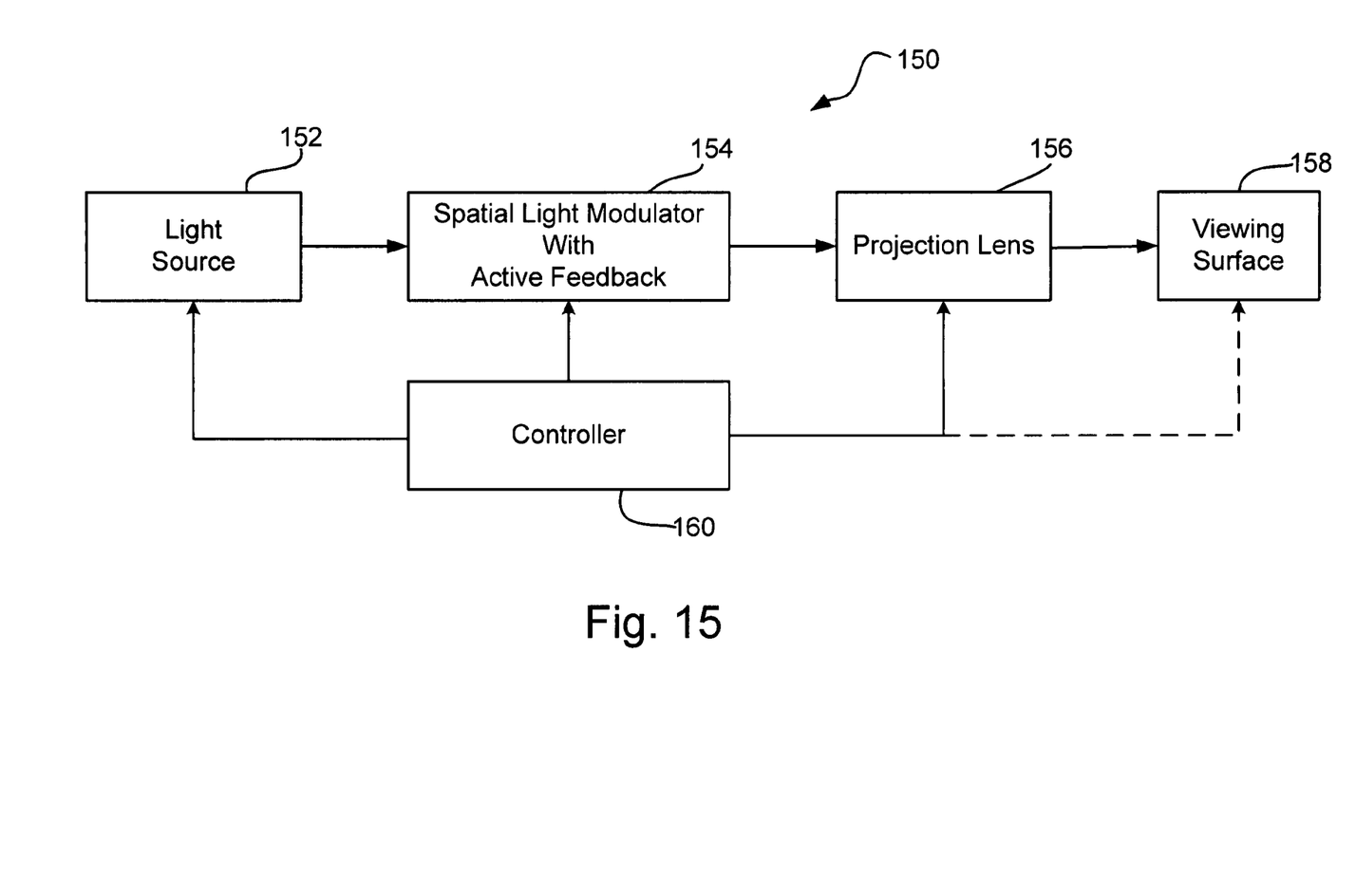
FIG. 15 is an exemplary block diagram of a display system incorporating at least one embodiment of the invention.

FIG. 15 is an exemplary block diagram of a display or projection system 150 that incorporates a spatial light modulator 154 that includes at least one MEMs device coupled to an active device with an active feedback control circuit used to provide an electrical stop. A light source 152, such as a high pressure mercury arc lamp, a xenon arc lamp, or a light emitting diode based source, to name just a few, is imaged onto the spatial light modulator 154. The spatial light modulator 154 is usually formed of an array of MEMs devices that provide a rotatable mirror or interferometric device with a movable gate that is used to vary the frequency, angle, intensity, or other property of the light. The light from the spatial light modulator 154 is optically coupled to a projection lens 156 to further image the modulated light onto a viewing surface 158. The projection lens 156 may include reflective, refactive, holographic or other imaging optics. The viewing surface 158 may be a front or rear projection screen, an active screen, a video monitor, a television screen, or some other viewing surface such as a wall or paper surface. A controller 160 may be used to control the light source 152 power or intensity, the data transmitted to the spatial light modulator 154, the amount of zoom or focus of the projection lens 156 and perhaps the reflectivity or emisstivity of the viewing surface 158 such as with an active screen. The controller 160 may be a microcontroller, a CPU, a digital signal processor or other type of logic controller. The controller 160 may have its logic controlled by fixed logic, programmable logic, or a combination of the two. The programmable logic may be encoded in firmware, software, or other forms of modifiable logic.

In addition, while the embodiments within have been described as having reflective or partially reflective surfaces, the movable gates or members may also in addition or in place of the reflective surfaces have diffractive grating that changes color or grey scale depending on the angle of tilt or displacement.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A MEMS device, comprising:
   at least one movable member;
   semiconductor device having at least one property affected by the location of the movable member with respect to the semiconductor device; and
   a control circuit to limit movement of the movable member based on observation of the property affected by the semiconductor device.

2. The MEMS device of claim 1 wherein the movable member is a part of a Fabry-Perot interferometer.

3. The MEMS device of claim 1 wherein the moveable member is a reflective surface.

4. The MEMS device of claim 1 wherein the movable member contains a diffractive grating.

5. The MEMS device of claim 1 wherein the affected property is current flowing in the semiconductor device.

6. The MEMS device of claim 1 wherein the affected property is a voltage potential across two points in the semiconductor device.

7. A MEMS devices, comprising:
   at least one movable member;
   a transistor having at least one property affected by the location of the movable member with respect to the transistor, wherein the movable member acts as a gate of the transistor; and
   a control circuit to limit movement of the movable member based on observation of the property affected by the transistor.

8. A MEMS device of comprising:
   at least one movable member;
   a tunneling device having at least one property affected by the location of the movable member with respect to the tunneling device; and
   a control circuit to limit movement of the movable member based on observation of the property affected by the tunneling device.

9. The MEMS device of claim 8 wherein the tunneling device is a photoconductor.

10. A method of making a MEMs device, comprising:
providing a movable member;
providing a semiconductor device adjacent to the movable member having a property affected by the location of the movable member relative to the semiconductor device; and
providing a circuit to sense the property of the semiconductor device and provide an electrical stop when a minimum separation distance is sensed.

11. A method of making a MEMs device, comprising:
providing a movable member;
providing a transistor adjacent to the movable member having a property affected by the location of the movable member relative to the transistor wherein the movable member acts as a gate of the transistor; and
providing a circuit to sense the property of the transistor and provide an electrical stop when a minimum separation distance is sensed.

12. A method of making a MEMs device, comprising:
providing a movable member;
providing a tunneling device adjacent to the movable member having a property affected by the location of the movable member relative to the tunneling device; and
providing a circuit to sense the property of the tunneling device and provide an electrical stop when a minimum separation distance is sensed.

* * * * *